United States Patent [19]
Albertson et al.

[11] Patent Number: 5,768,895
[45] Date of Patent: Jun. 23, 1998

[54] PRESSURE RELIEF SYSTEM AND METHOD FOR A REFRIGERATOR SYSTEM

[76] Inventors: Luther D. Albertson, 1014 Plum Ridge Rd., Sellersberg, Ind. 47172; Walter R. Key, 1280 Diablo Rd., Greenwood, Ind. 46143; Mark B. Key, 6434 Harting Overlook, Indianapolis, Ind. 46227

[21] Appl. No.: 864,979

[22] Filed: May 28, 1997

Related U.S. Application Data

[63] Continuation-in-part of Ser. No. 654,619, May 29, 1996, Pat. No. 5,729,991.

[51] Int. Cl.⁶ .................................................. F25B 45/00
[52] U.S. Cl. ................................ 62/77; 62/174; 62/149; 137/522; 137/876
[58] Field of Search .............................. 62/149, 174, 77; 137/522, 523, 524, 876, 872, 873, 874, 875

[56] References Cited

U.S. PATENT DOCUMENTS

| | | | |
|---|---|---|---|
| 2,661,016 | 12/1953 | Leffler | 137/522 |
| 3,508,236 | 4/1970 | Adams | 340/240 |
| 4,403,626 | 9/1983 | Paul, Jr. | 137/876 |
| 4,408,194 | 10/1983 | Thompson | 340/626 |
| 4,821,772 | 4/1989 | Anderson, Jr. et al. | 137/876 |
| 4,967,791 | 11/1990 | Sternberger | 137/522 |
| 5,259,204 | 11/1993 | McKeown | 62/174 |
| 5,319,945 | 6/1994 | Bartlett | 62/174 |
| 5,333,468 | 8/1994 | Rice | 62/174 |
| 5,335,511 | 8/1994 | McKeown | 62/174 |
| 5,359,863 | 11/1994 | Lewis | 62/149 |
| 5,361,592 | 11/1994 | Lewis | 62/86 |
| 5,379,604 | 1/1995 | Furr | 62/77 |
| 5,408,840 | 4/1995 | Talley | 62/126 |
| 5,481,883 | 1/1996 | Harkness, Jr. et al. | 62/77 |
| 5,542,261 | 8/1996 | Albertson et al. | 62/174 |

*Primary Examiner*—John M. Sollecito
*Attorney, Agent, or Firm*—Woodard, Emhardt, Naughton, Moriarty & McNett

[57] ABSTRACT

A pressure relief system for a mechanical refrigeration system. The pressure relief system has a pair of rupture disks connected in series to a pressure vessel that contains refrigerant. The pressure relief system allowing the changing of the primary rupture disk while the vessel is pressurized without the loss of overpressure protection.

18 Claims, 11 Drawing Sheets

PRESSURE RELIEF SYSTEM AND METHOD FOR A REFRIGERATOR SYSTEM

This application is a continuation in part of application Ser. No. 08/654,619, filed May 29, 1996, now U.S. Pat. No. 5,729,991, and incorporated herein by reference.

BACKGROUND OF THE INVENTION

The present invention relates generally to the field of pressure relief systems for mechanical refrigeration systems, and more particularly to a pressure relief system that allows the removal of one pressure relief unit from a pressurized vessel without the loss of refrigerant or vessel protection. Although the invention was developed for mechanical refrigeration systems, certain applications may be outside of this field.

Refrigeration systems are utilized in many commercial and industrial applications, such as to provide air conditioning in hotels, the cooling of heat transfer medium in a manufacturing process, and commercial food refrigeration systems. Inherent with each of the above refrigeration systems is a customer expectation of minimal equipment downtime. Any downtime associated with the mechanical refrigeration system is at best an inconvenience for the customer, and often can have very costly consequences, such as food spoilage in commercial food refrigeration systems.

Mechanical refrigeration systems generally utilize a chlorinated fluorocarbon (CFC) refrigerant. CFC refrigerants, many of which are sold by DuPont under the well known trade name FREON have various boiling points depending on the particular type of CFC refrigerant. FREON and its related family of compounds are well known and widely used as heat transfer media in mechanical refrigeration systems wherein the transfer of heat involves manipulating the compounds to various temperature and pressure states. Any significant misuse and/or malfunction of the refrigerant system can cause excessive internal pressure and without prompt corrective action may lead to damage of the equipment and/or injury to personnel.

It is known that refrigeration systems generally include the pressurized storage of a vaporized refrigerant. In an effort to comply with applicable state and/or local codes and regulations most refrigeration systems include a pressure relief system for protecting the pressure vessel from over-pressurization. For many years there was minimal industry recognition of problems associated with venting CFC refrigerants from the pressure vessel into the environment. Recently, because of the concern for the environment and the possible destruction of the ozone layer above the earth, it has become desirable, and in many cases mandated that the release of CFC refrigerant into the environment be minimized.

Environmental concerns, though significant, are not the only factor in favor of minimizing the release of CFC refrigerant into the environment. In recent years the price of many CFC refrigerants have escalated drastically, for example the price of some refrigerants have increased over ten fold, while the available supply is dwindling. Thus, for economic and environment reasons it is desirable to minimize the discharge of refrigerant into the environment.

In the design of pressure relief systems for mechanical refrigeration systems it has become an industry practice to utilize a mechanical pressure relief reseating type valve. Typically, mechanical reseating type valves have been connected to a pressure vessel or fluid pathway which is connected to the pressure vessel. With reference to FIG. 1, there is illustrated a prior art mechanical reseating type valve (a) which is connected to a pressure vessel (b). The valve (a) being a mechanical reseating type valve which is operable to allow the discharge of refrigerant from the vessel (b) to protect the vessel from over-pressurization, and recloseable to prevent further release of fluid from the vessel.

A common limitation associated with the prior art pressure relief systems is that the refrigerant must be evacuated from the pressure vessel and the refrigeration system prior to the repair and/or replacement of the pressure relief system. The evacuation of the refrigerant is an involved, time consuming, and costly procedure which requires shutting down the commercial or industrial operation while the refrigerant is removed from the refrigeration system. Typically the charge of CFC refrigerant in a system is in the range of about 50 to 2500 pounds, or more. Further, many commercial and industrial refrigeration systems are in constant demand with no scheduled downtime, therefore, the necessity to evacuate the refrigerant from the system causes the commercial or industrial operation to be shut down with a corresponding loss of revenue.

Even with a variety of earlier designs of pressure relief systems for mechanical refrigeration systems, there remains a need for an improved pressure relief system. The present invention satisfies this need in a novel and unobvious way.

SUMMARY OF THE INVENTION

To address the unmet needs of pressure relief systems for mechanical refrigeration systems, one embodiment of the present invention contemplates an apparatus comprising a passageway in fluid communication with a refrigeration system and a rupture disk slidable within said passageway between a sealing position and a bypassing position. A removable actuator member places said rupture disk in the bypassing position and a spring urges said rupture disk to the sealing position.

One object of one embodiment of the present invention is to provide an improved pressure relief system for a mechanical refrigeration system.

Related objects and advantages of the present invention will be apparent from the following description.

DESCRIPTION OF THE PREFERRED EMBODIMENT

Figure 1:
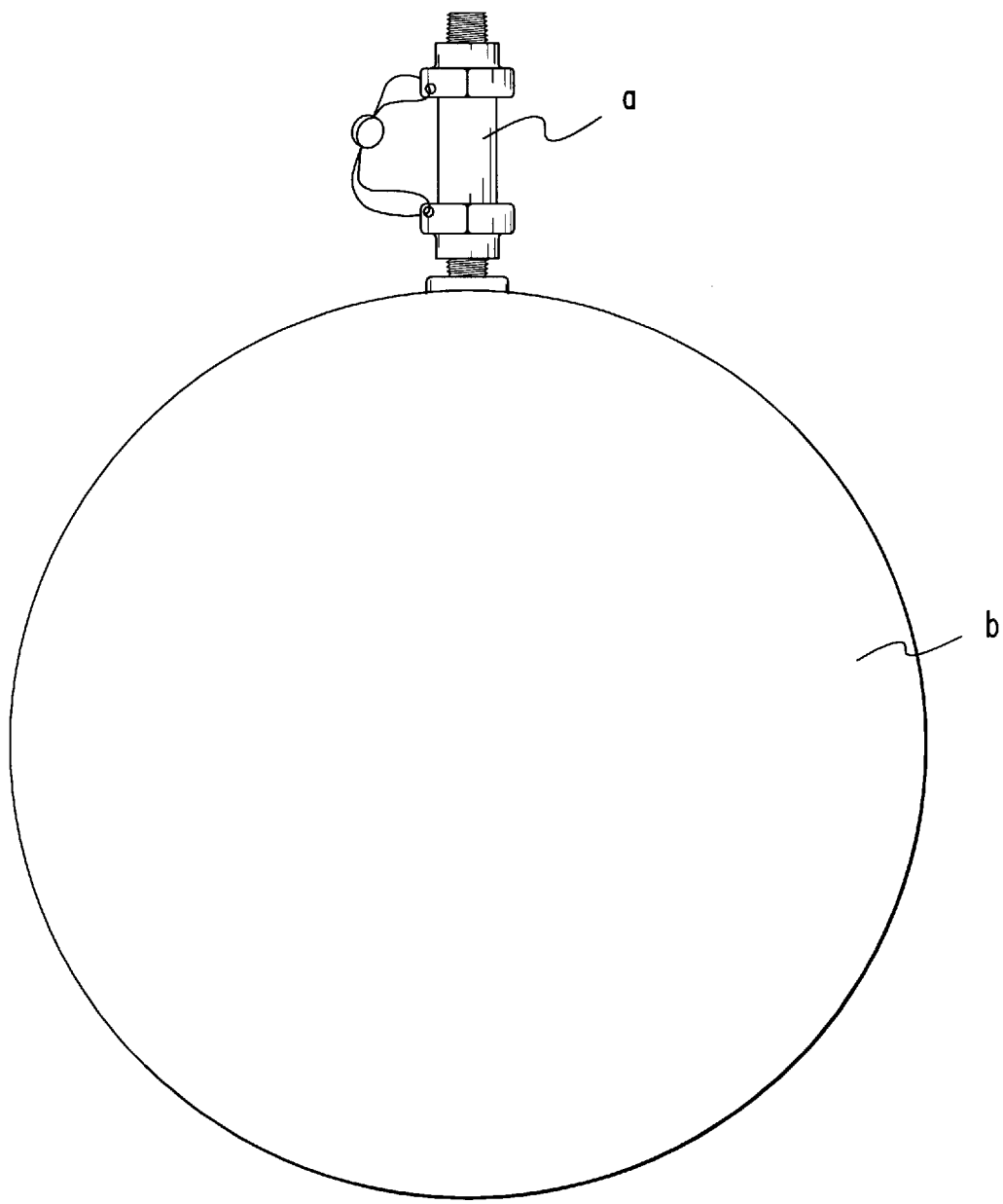
FIG. 1 is an illustrative view of a prior art pressure relief valve connected to a pressure vessel.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
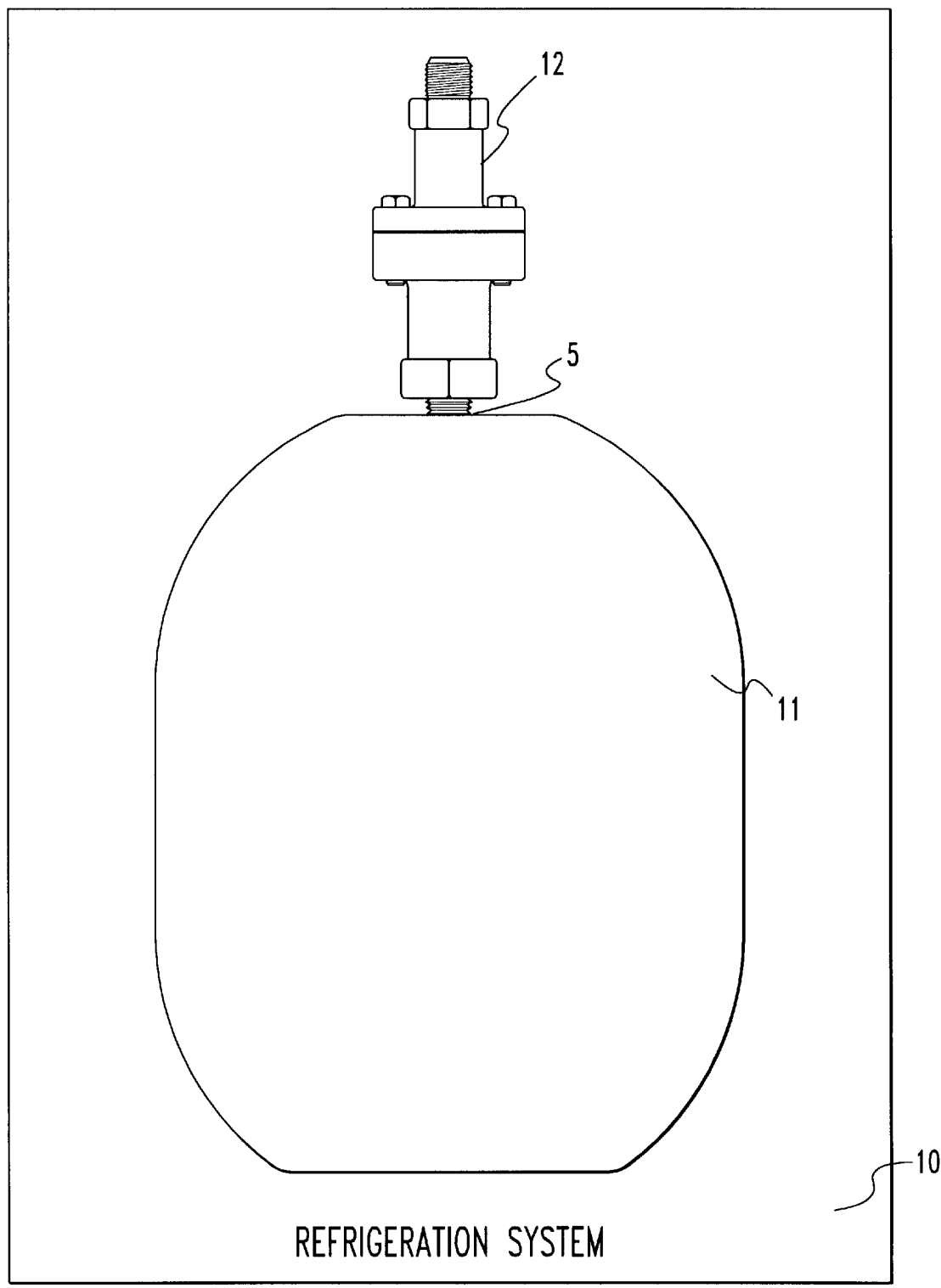
FIG. 2 is an illustrative view of a mechanical refrigeration system with a pressure relief system coupled thereto according to the first embodiment of the present invention.

FIGS. 2–6 depict a first embodiment of the present invention. With reference to FIG. 2, there is illustrated a mechanical refrigeration system 10 having a pressure vessel 11 coupled thereto and/or within and which is protected from over-pressurization by a pressure relief system 12. The vessel 11 having an aperture 5 therein for allowing fluid communication with the pressure relief system 12. The pressure vessel 11 comprises a portion of the closed loop refrigeration system that generally has three primary components through which a fluid flows. One of ordinary skill in the art understands that the three primary components include a compressor, a condenser, and an evaporator. The compressor is utilized to pressurize the fluid from a relatively low pressure gaseous state to a higher pressure gaseous state. It is understood that the fluid used in a refrigeration system is a refrigerant.

Upon exiting the compressor the relatively high pressure refrigerant gas flows into the condenser, which functions as a heat exchanger. The condenser removes energy from the vaporized refrigerant to facilitate the condensation of the relatively high pressure refrigerant vapor into a liquefied refrigerant which flows to the evaporator. The evaporator, being of a conventional design, functions to cool a heat exchange medium as the refrigerant is vaporized into a low pressure refrigerant gas, thereby absorbing energy from the heat exchange medium. The low pressure refrigerant gas is then drawn into the compressor to begin the refrigerant cycle again.

In order to comply with safety codes and to protect the equipment and associated personnel the pressure vessel 11 has coupled thereto the pressure relief system 12 that allows the selective venting of refrigerant gas from the vessel. The pressure relief system 12 functions to normally prevent the discharge of refrigerant from vessel 11 into the environment, however when the pressure within the vessel 11 exceeds a threshold pressure the reseatable pressure relief system 12 opens to allow refrigerant to be vented therefrom. The threshold pressure necessary to open the pressure relief system 12 is dependent upon many parameters and the selection of a pressure relief system that will open at the desired pressure is within the capability of those of ordinary skill in the art. In the first embodiment pressure relief system 12 is designed to open at about 235 pounds per square inch gauge. Further, it is preferred that the pressure relief system 12 be designed to open in a range of about 200–450 pounds per square inch gauge. The above pressure values for opening the pressure relief system are not meant to be limiting, and it is understood that pressure relief systems opening at other values are contemplated herein.

Figure 3:
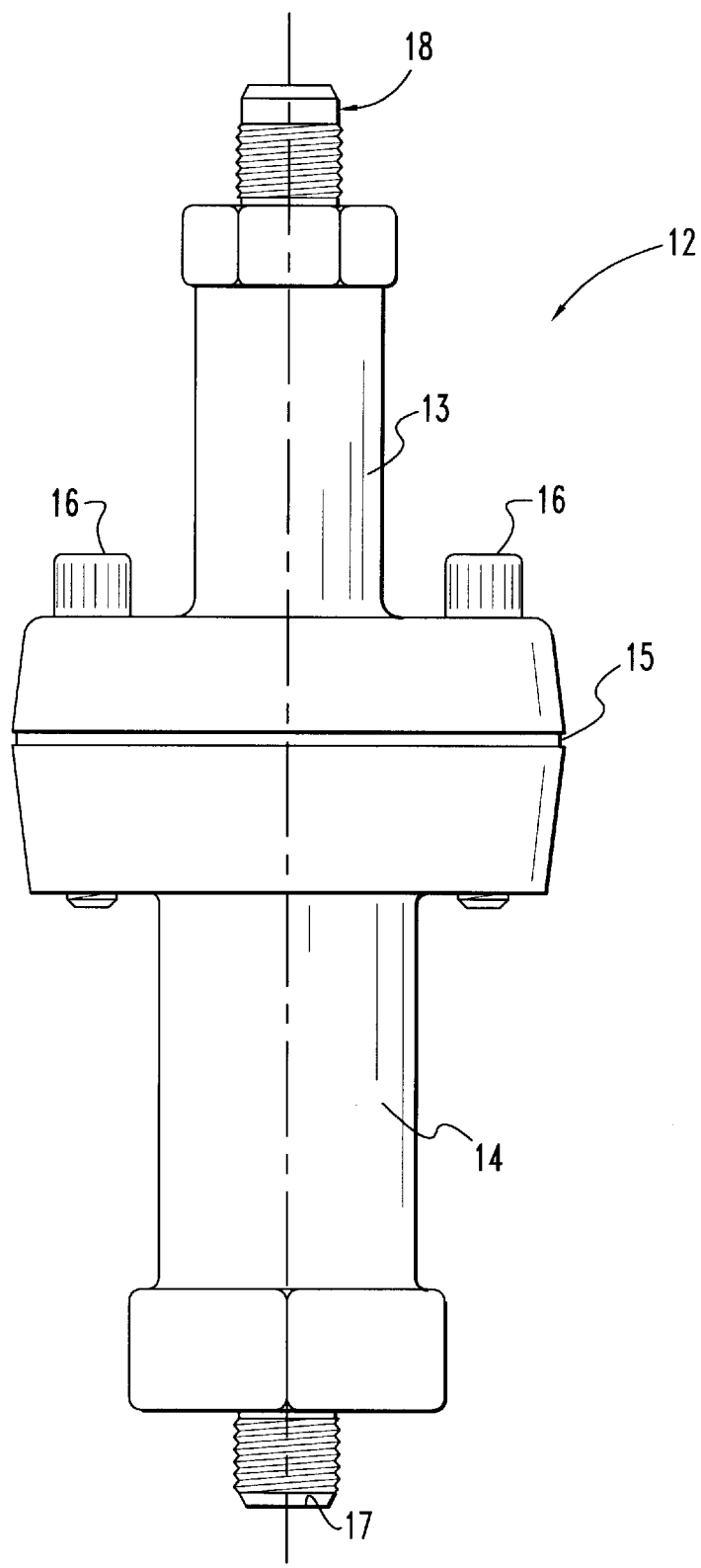
FIG. 3 is an enlarged side elevational view of the FIG. 2 pressure relief system.

Referring to FIG. 3, there is illustrated an enlarged side elevational view of the pressure relief system 12. The pressure relief system 12 includes a primary pressure relief unit 13 having a primary pressure relief valve therein, and a secondary pressure relief unit 14 having a secondary pressure relief valve therein that are in fluid communication with pressurized vessel 11 through opening 5. It is understood that the pressurized vessel is pressurized above atmospheric pressure. A sealing gasket 15 is positioned and compressible between the primary pressure relief unit 13 and the secondary pressure relief unit 14 to provide a fluid tight seal. A pair of fasteners 16 couple together the primary pressure relief unit 13 and the secondary pressure relief unit 14. In the first embodiment the fasteners are cap screws, although other fasteners are suitable. An externally threaded connector 17 extends from the secondary pressure relief unit 14 for coupling the system 12 to the pressure vessel 11 of the refrigeration system 10. A threaded vent tube connector 18 extends from the primary pressure relief unit 13 for connection to a vent tube (not illustrated). It is clearly understood that other methods of connecting the pressure relief valve system 12 to supporting structure, such as soldering and sweating are contemplated herein.

Figure 4:
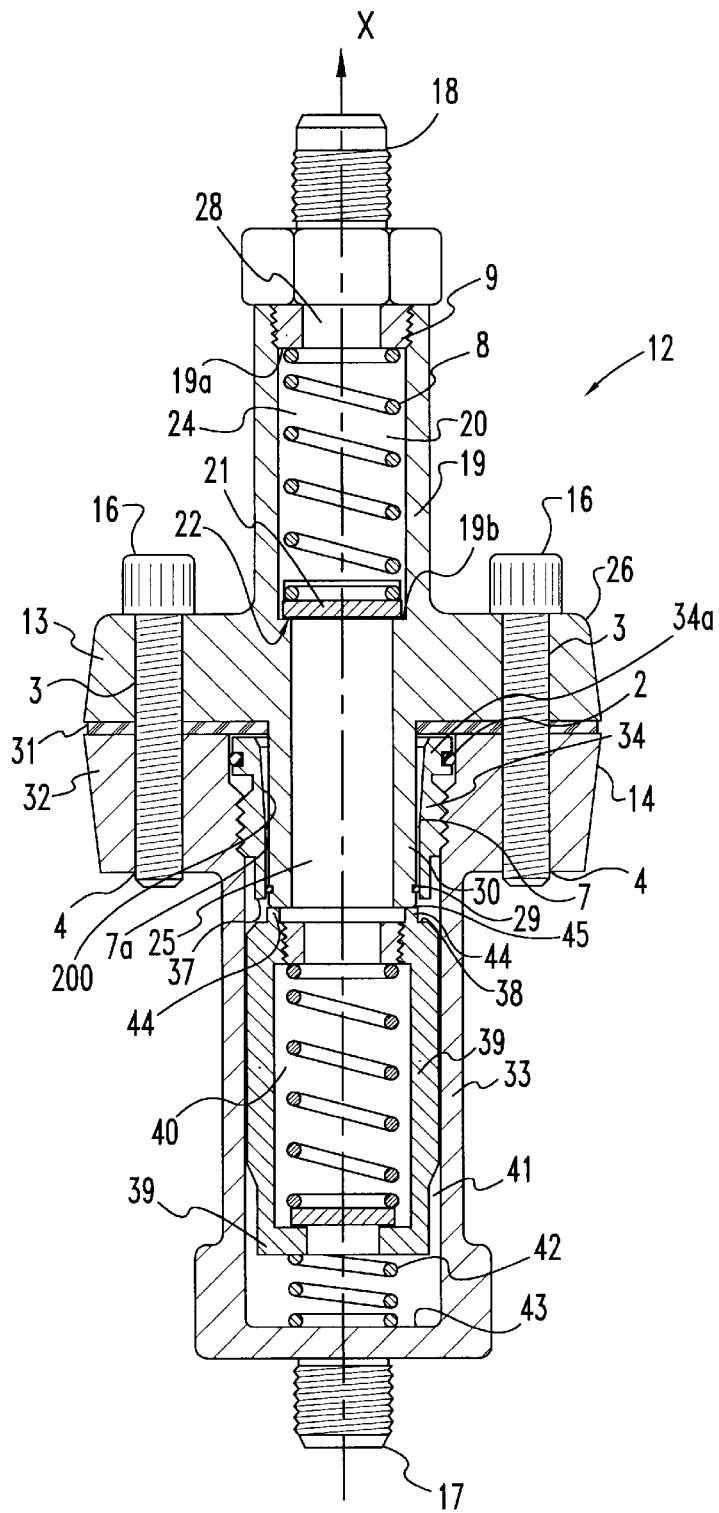
FIG. 4 is a side elevational view in full section of the FIG. 2 pressure relief system.

With reference to FIG. 4, there is illustrated a side elevational view in full section of the mechanical pressure relief system 12. The primary pressure relief unit 13 having a primary unit body 19 with a mechanical pressure relief valve 20 disposed therein for providing primary pressure protection of the vessel 11. Preferably, the unit body 19 is integrally cast and includes a mating flange 26 extending from the valve body. The flange having two spaced apertures 3 passing therethrough for the receipt of fasteners 16. It is preferred that body 19 be formed of a material that is substantially resistant to corrosion, such as brass or stainless steel. Other materials having the necessary properties are contemplated herein.

In the first embodiment the primary pressure relief valve 20 being a direct straight through type relief valve. A removable spring 8, that is kept in place by a removable spring retainer 9, is positioned between an upper portion 19a of the primary unit body 19 and a lower portion 19b of the unit body. A reseatable seat disk 21 is positioned on, and is normally spring biased against valve seat 22 by spring 8 to normally prevent the flow of fluid from the vessel 11. In the first embodiment reseatable seat disk 21 is formed of an elastomeric material, and one preferred material is Neoprene. It is understood that other types of reseatable pressure relief valves are contemplated herein provided that they provide a bubble tight seat.

The primary pressure relief valve 20 being positioned in a passageway 24 that is coaxial with a second passageway 25 extending through the primary unit body 19. A fluid exit aperture 28 is positioned coaxial with passageways 24 and 25.

It is preferable that secondary valve actuator 30 is integrally cast with the primary unit body 19 and extends parallel to the centerline X. The secondary actuator 30 being substantially cylindrical and extending from a lower surface 31 of the primary unit body 19 and being sized such that it is insertable into the secondary pressure relief unit 14. A seal 29 is positioned circumferentially around the secondary actuator 30 to form a transitional fluid seal with a portion of the secondary pressure relief unit 14. In the first embodiment the seal 29 is an O-ring. The secondary pressure relief unit 14 having a secondary unit body 33 that is preferably integrally cast of a material as disclosed for unit body 19. Secondary unit body 33 having a flange 32 extending therefrom which corresponds with flange 26 of the primary unit body 19. Flange 32 including a pair of spaced threaded apertures 4 for receiving the fasteners 16 therein.

A transitional member 34 is coupled to the secondary unit body 33. The transitional member 34 having a passageway therethrough which is sized to receive the secondary valve actuator 30 therein and a substantially fluid tight seal is formed between seal 29 and the substantially cylindrical portion 7 of the transition member 34. The transitional member 34 having a first end 34a that is enlarged to provide an enlarged tapered surface 200 that transitions to the substantially cylindrical surface 7a of the cylindrical portion 7. It is preferable that the enlarged tapered surface 200 defines a right circular cone. The surface 200 provides a lead-in for easier entry of the secondary valve actuator 30 into the secondary unit body 33.

Seal 29 when passed into the transitional member 34 forms a substantially fluid tight seal when disposed adjacent the substantially cylindrical surface 7a. While the seal 29 is adjacent the surface 200 there is not formed a substantially fluid tight seal. The substantially non-sealing arrangement between surface 200 and seal 29 provides a safety feature in that upon removal of the primary unit body 19, any pressurized fluid that may act on the primary unit body 19 bypasses through this enlarged frusto-conical cavity at end 34a. Further, the sound of any escaping gas in the area is a warning signal to a technician servicing the system 12. Cap screws 16 are of sufficient axial length to allow the seal 29 to be positioned in the first end 34a of transitional member 34 before the primary and secondary pressure relief units 13 and 14 are uncoupled, thereby providing an added safety feature to the service technician. It is preferable that the transitional member 34 is threaded into the secondary unit body 33. In one embodiment a seal 2 provides for a substantially fluid tight joint between the transitional member 34 and the secondary unit body 33. In alternate embodiments of the present invention the transitional member 34 is connected to the secondary unit body 33 by other affixation methods known to those of ordinary skill in the art.

In the first embodiment transitional member 34 having an annular valve seat surface 37 which is contactable with an outer annular portion 38 of a secondary pressure relief valve body 39. The secondary pressure relief valve 40 being moveable within a passageway 41 formed within the secondary unit body 33. The secondary pressure relief valve 40 being moveable upon the removal of primary pressure relief unit 14 such that the annular portion 38 of valve body 39 engages and forms a substantially fluid tight seal with the annular valve seat surface 37. In the first embodiment the primary pressure relief valve 20 and the secondary pressure relief valve 40 being in series with one another.

Secondary pressure relief valve 40 being normally spring biased by a spring 42 from surface 43 of the secondary unit body 33. In the first embodiment a pair of upstanding spaced partial annular rings 44 extend axially from the secondary pressure relief valve body 39. The pair of partial annular rings 44 being contactable by the lower annular surface 45 of the secondary valve actuator 30 when the primary pressure relief unit 13 is in place. With the primary pressure relief unit 13 coupled to the secondary pressure relief unit 14 the seating surface 37 and the annular portion 38 of the secondary pressure relief valve are not disposed in a sealing relationship. Therefore, fluid from pressure vessel 11 can flow around the secondary pressure relief valve 40, through aperture 25, and bear against the reseatable disk 21 of the primary pressure relief valve 20. Upon the pressure acting upon the reseatable seat disk exceeding a predetermined pressure the primary pressure relief valve 20 opens to allow the release of fluid and reduce the pressure within vessel 11. While the primary pressure relief unit 13 is coupled to the secondary pressure relief unit 14, the secondary pressure relief valve 40 is rendered inoperable for controlling the discharge of fluid from the pressure vessel 11.

Figure 5:
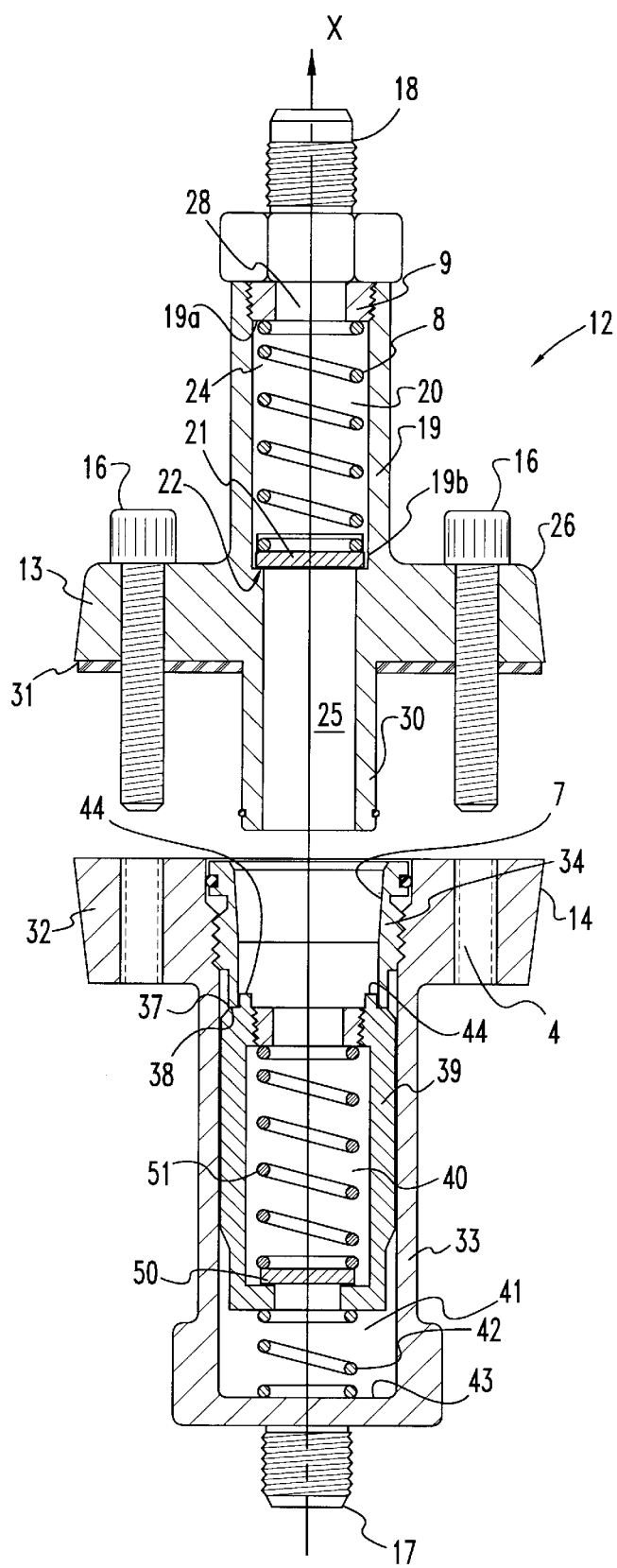
FIG. 5 is a side elevational view in full section of the mechanical pressure relief system of FIG. 2 with a primary pressure relief unit comprising a portion of the mechanical pressure relief system uncoupled therefrom.

With reference to FIG. 5, there is illustrated pressure relief system 12 with the primary pressure relief unit 13 uncoupled from the secondary pressure relief unit 14. Removal of the primary pressure relief unit 13 from the secondary pressure relief unit 14 is generally accomplished by loosening and removing the pair of fasteners 16 from the threaded apertures 4 of secondary unit flange 32. Upon the uncoupling and removal of the primary pressure unit 13 from the mechanical pressure relief system 12, the secondary pressure relief valve 40 is biased by spring 42 away from surface 43 so that annular valve seat surface 37 and the outer annular portion 38 of secondary valve body 39 are brought into a substantially fluid tight arrangement. With the primary pressure relief unit 13 removed from the mechanical pressure relief system 12 the secondary pressure relief valve 40 normally prevents the discharge of fluid into the environment and provides vessel over-pressurization protection.

While the primary pressure relief unit 13 is removed from the pressure relief system 12 the pressurized fluid now acts against a reseatable seat disk 50 positioned within the secondary pressure relief valve 40. The secondary pressure relief valve 40 is a direct acting straight through type pressure relief valve substantially like primary pressure relief valve 20 utilized in the primary pressure relief unit 13. A spring 51 provides a normal force to keep the secondary pressure relief valve 40 closed until the fluid pressure acting on disk 50 exceeds the spring force. Upon the fluid pressure acting on disk 50 exceeding the spring force of spring 51 the fluid forces open the secondary pressure relief valve 40 to discharge fluid.

Figure 6:
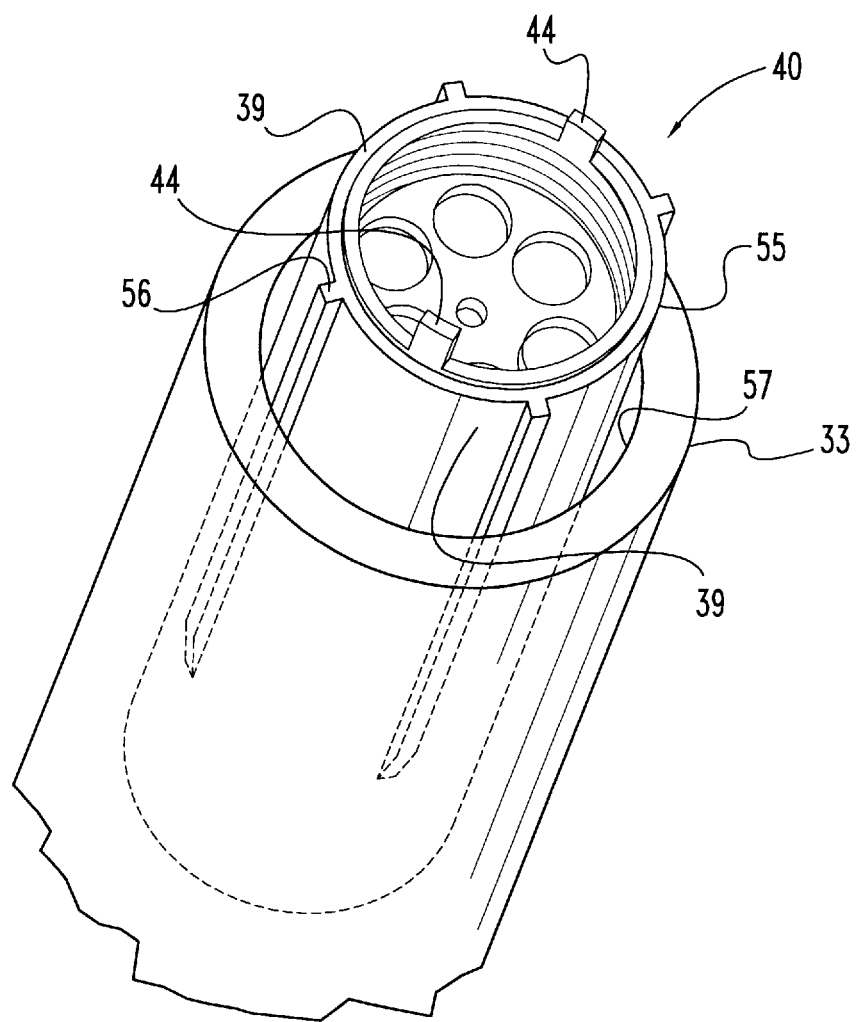
FIG. 6 is a perspective view of a secondary pressure relief valve comprising a portion of the FIG. 2 mechanical pressure relief system.

With reference to FIG. 6, there is illustrated a perspective view of the secondary pressure relief valve 40 extending from the secondary unit body 33 with flange 32 removed. In the first embodiment secondary pressure relief valve body 39 includes a substantially cylindrical outer wall member 55 having a plurality of ribs 56 which extend along a substantial portion of the body's axial length. The plurality of ribs 56 function to space the substantially cylindrical wall member 55 from the substantially cylindrical surface 57 formed in the secondary unit body 33. It is preferable that the plurality of ribs 56 being located 90° apart. Further, the plurality of ribs 56 forming forming fluid flow paths between the inner cylindrical surface 57 and the body 39 of the pressure relief valve 40.

Having described one embodiment of the pressure relief system 12 an example of its operation will now be described with the assistance of FIGS. 2–5. The pressure relief system 12 is connected to vessel 11 by engaging the connector 17 into a correspondingly threaded aperture within the vessel. With the pressure relief system 12 coupled to the vessel 11 the release of pressurized fluid from the vessel is normally eliminated and over-pressurization protection is provided by the primary pressure relief unit 13.

Removal of the primary pressure relief unit 13 from a pressurized vessel 11 is accomplished by loosening the pair of fasteners 16 from the flange of the secondary pressure relief unit 14. Upon removal of the fasteners 16 the spring 42 biases the second pressure relief valve 40 axially against the transitional member 34 to form a fluid tight seal between annular portion 38 and annular sealing surface 37. The secondary pressure relief valve 40 now preventing the normal discharge of fluid from the vessel 11 and providing over-pressure protection. The installation of the primary pressure relief unit 13 involves inserting the secondary valve actuator 30 within the transitional member 34. The connection and tightening of the cap screws 16 draw the primary and secondary unit together. As the primary unit is connected to the secondary unit the valve actuator 30 renders the secondary pressure relief valve 40 inoperable for controlling the release of fluid from the vessel 11. Secondary pressure relief valve 40 becomes biased away from sealing surface 37.

Figure 7:
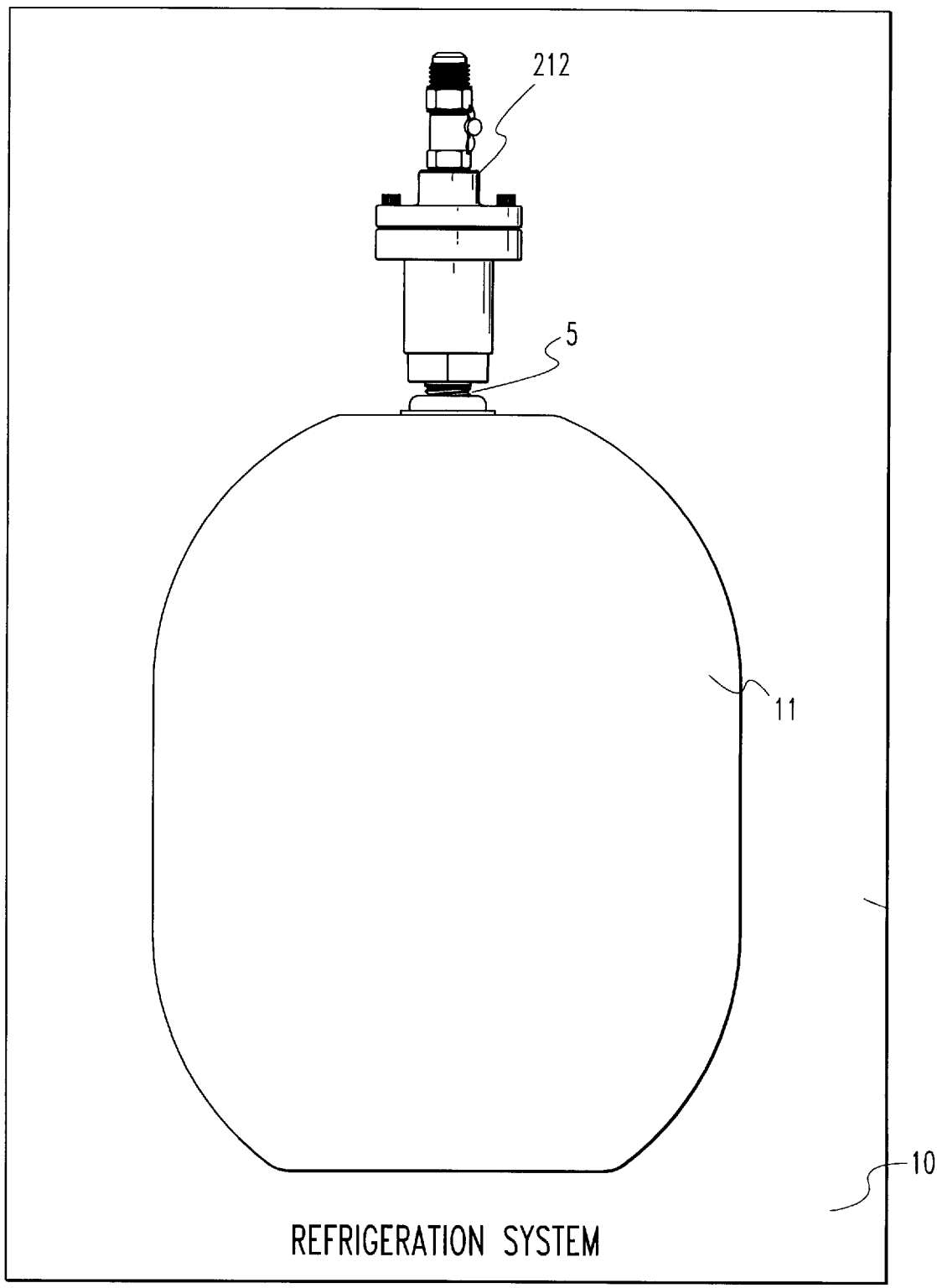
FIG. 7 is an illustrative view of the mechanical refrigeration system with a pressure relief system coupled thereto according to a second embodiment of the present invention.

A second embodiment of the present invention is shown in FIGS. 7–11. With reference to FIG. 7, there is illustrated the mechanical refrigeration system 10 with a pressure vessel 11 coupled thereto and/or within and which is protected from over-pressurization by a pressure relief system 212. The vessel 11 having aperture 5 therein for allowing fluid communication with the pressure relief system 212.

In order to comply with safety codes and to protect the equipment and associated personnel the pressure vessel 11 has coupled thereto the pressure relief system 212 that allows the selective venting of refrigerant gas from the vessel. The pressure relief system 212 functions to normally prevent the discharge of refrigerant from vessel 11 into the environment, however when the pressure within the vessel 11 exceeds a first threshold pressure level a primary rupture disk 100 fails and at a second threshold pressure level a reseatable pressure relief valve 220 opens to allow refrigerant to be vented therefrom. The threshold pressures necessary to rupture primary disk 100 and open the pressure relief valve 220 are dependent upon many parameters and the selection of a pressure relief system that will open at the desired pressure is within the capability of those of ordinary skill in the art.

It is preferred that rupture disk 100 be designed to fail at about 235 pounds per square inch gauge and valve 220 open and relieve at about 10 psi higher than the disk 100. Further, the pressure relief system 212 is designed to operate in a range of about 200–450 pounds per square inch gauge. The above pressure values for system 212 are not meant to be limiting, and it is understood that pressure relief systems opening at other values are contemplated herein.

Figure 8:
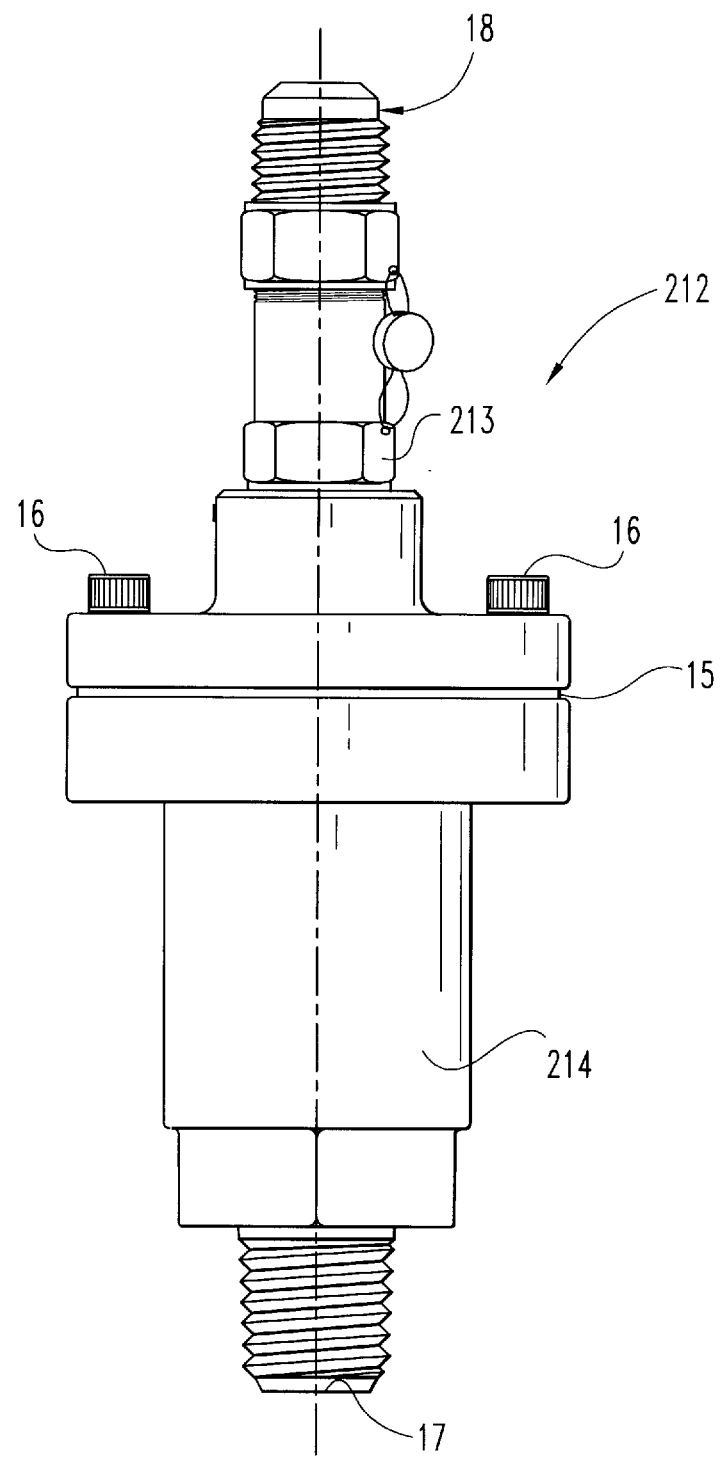
FIG. 8 is an enlarged side elevational view of the FIG. 7 pressure relief system.

Referring to FIG. 8, there is illustrated an enlarged side elevational view of the pressure relief system 212. The pressure relief system 212 includes a primary pressure relief unit 213 having a primary pressure relief valve 220 and primary rupture disk 100 therein, and a secondary pressure relief unit 214 having secondary rupture disk 102 therein that is in fluid communication with rupture disk 100 and pressurized vessel 11 through opening 5. Rupture disks 100 and 102 are any of the type of pressure relief devices that are generally in the shape of a cylindrical disk and that relieve pressure by permanently deforming and creating an opening through which pressurized gas escapes. It is understood that the pressurized vessel is pressurized above atmospheric pressure.

When units 213 and 214 are coupled, primary rupture disk 100 seals against fluid discharge from pressure vessel 11. A sealing gasket 15 is positioned and compressible between the flange of primary pressure relief unit 213 and the secondary pressure relief unit 214 to provide a fluid tight seal. A pair of fasteners 16 couple together the primary pressure relief unit 213 and the secondary pressure relief unit 214. It is preferable that the fasteners are cap screws. An externally threaded connector 17 extends from the secondary pressure relief unit 214 for coupling the system 212 to the pressure vessel 11 of the refrigeration system 10. A threaded vent tube connector 18 extends from the primary pressure relief unit 213 for connection to a vent tube (not illustrated). It is clearly understood that other methods of connecting the pressure relief valve system 212 to supporting structure, such as soldering and sweating are contemplated herein.

Figure 9:
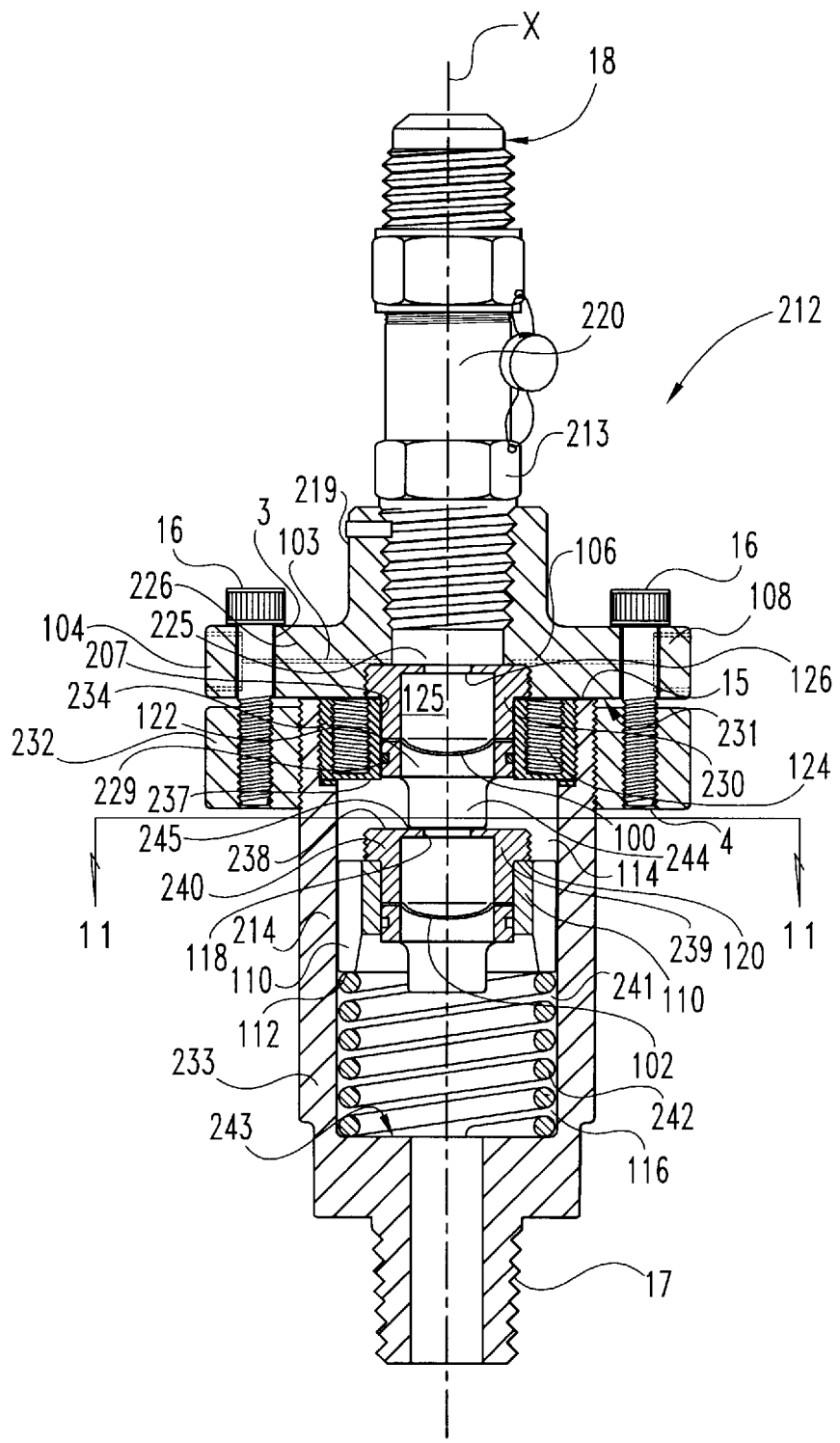
FIG. 9 is a sectional side elevational view of the FIG. 7 pressure relief system.

With reference to FIG. 9, there is illustrated a side elevational view in partial section of the mechanical pressure relief system 212. The primary pressure relief unit 213 having a primary unit body 219 with a mechanical pressure relief valve 220 disposed therein for providing primary pressure protection of the vessel 11. Preferably, the unit body 219 is integrally cast and includes a mating flange 226 into which pressure relief valve 220 is threaded. The flange 226 having two spaced apertures 3 passing therethrough for the receipt of fasteners 16. It is preferred that body 219 be formed of a material that is substantially resistant to corrosion, such as brass or stainless steel. Other materials having the necessary properties are contemplated herein.

In the second embodiment the primary pressure relief valve 220 being a direct straight through type relief valve threadably received within body 219. The primary pressure relief valve 220 including a passageway 225 extending through the primary unit body 219 that is in fluid communication with connector 18.

Body 219 also includes ports 104 and 108 in fluid communication with passageway 225 through passageways 103 and 106, respectively. Ports 104 and 108 are useful for connection to devices such pressure switches and pressure gauges.

Disk actuator assembly 230 is threadably received into the primary unit body 219 and extends parallel to a centerline X. Actuator assembly 230 being substantially cylindrical and incorporating a primary rupture disk 100 located within body 231. A chamber 125 is formed between disk 100 and orifice 126 of body 231. Chamber 125 is in fluid communication with passageway 225 and valve 220.

A pair of actuating members 244 are coupled to assembly 230 and extend from the substantially cylindrical section thereof and contact a backup, or secondary, rupture disk assembly 240. A seal 229 is positioned circumferentially around the primary actuator assembly 230 to form a transitional fluid seal with transitional member 234 of secondary pressure relief unit 214. In the preferred embodiment the seal 229 is an O-ring. The secondary pressure relief unit 214 having a secondary unit body 233 that may be integrally cast of a material as disclosed for unit body 219. It is preferable that body 233 be externally threaded to receive flange 232 which corresponds with flange 226 of the primary unit body 219. Flange 232 including a pair of spaced threaded apertures 4 for receiving the fasteners 16 therein.

A transitional member 234 is threadably coupled to the secondary unit body 233. A pair of threaded holes 124 located within member 234 can be used to assist in coupling and uncoupling member 234 from body 233. The transitional member 234 having a passageway therethrough which is sized to threadably receive the primary disk actuator assembly 230 therein and a substantially fluid tight seal is formed between seal 229 and the substantially cylindrical portion 207 of the transition member 234. Portion 207 may provide a lead-in for easier entry of the primary disk actuator 230 into the secondary unit body 233. As an alternative, portion 207 can include a conical taper over its length, such that removal of actuator 230 from portion 207 results in reduction of the sealing ability of seal 229.

Secondary rupture disk assembly 240 includes secondary rupture disk body 239 and secondary, or backup, rupture disk 102. Transitional member 234 having an annular seat surface 237 which is contactable with outer annular portion 238 of secondary rupture disk body 239. The secondary rupture disk assembly 240 being movable within diameter 116 of a passageway 241 formed within the secondary unit body 233. The secondary rupture disk assembly 240 being movable upon the removal of primary pressure relief unit 213 such that the annular portion 238 engages and forms a substantially fluid tight seal with the annular seat surface 237. The primary pressure relief valve 220, the primary rupture disk assembly 230, and the secondary rupture disk assembly 240 being in series with one another. Secondary rupture disk assembly 240 being normally urged by a spring 242 which contacts slidable support 110 at surface 112. Spring 242 is biased from surface 243 of the secondary unit body 233. Support 110 is free to slide within passageway 341. Support 110 contacts body 234. Spring 242 thus urges support 110 and assembly 240 toward a sealing, or closed position.

Figure 11:
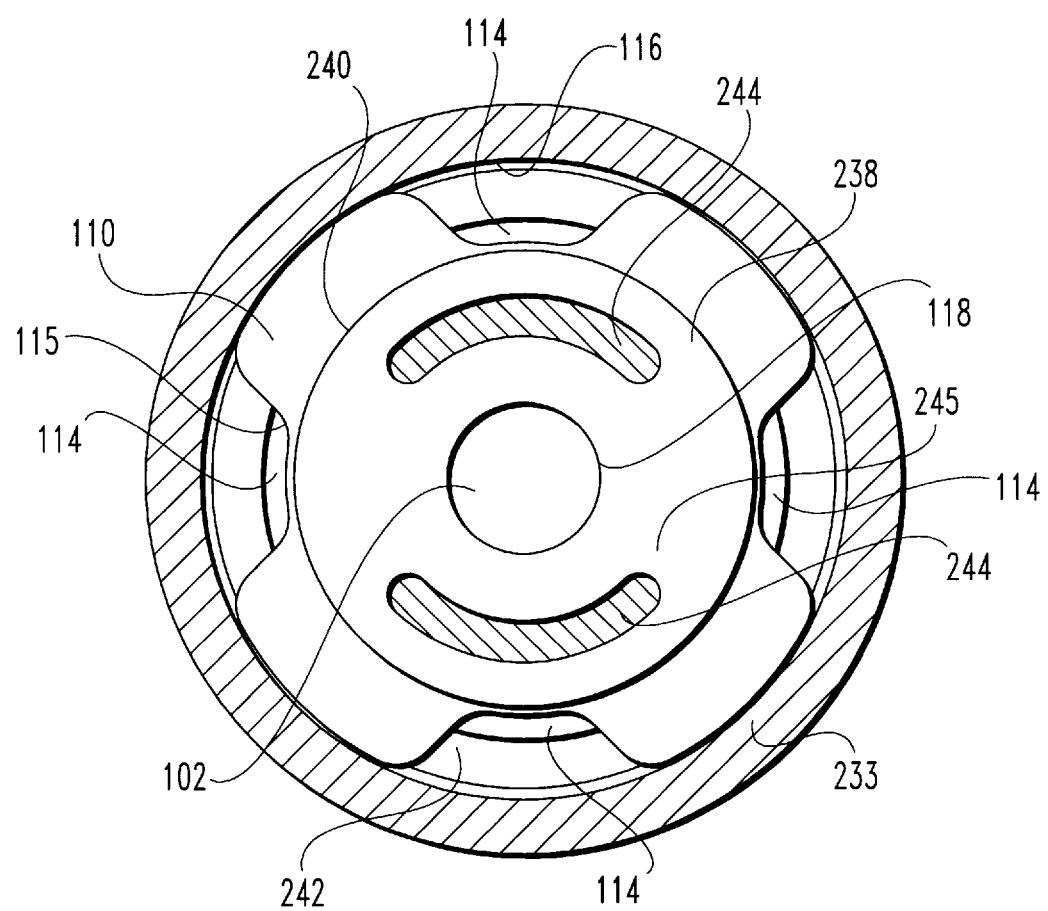
FIG. 11 is a cross sectional view of FIG. 9 taken along line 11—11.

In the second embodiment a pair of spaced actuating members 244 extend axially from actuator assembly 230 and couple rupture disks 100 and 102. The pair of actuating members 244 contacting surface 245 of body 239 when the primary pressure relief unit 213 is in place. With the primary pressure relief unit 213 coupled to the secondary pressure relief unit 214, the seating surface 237 and the annular portion 238 of rupture disk assembly 240 are not disposed in a sealing relationship. Passageways 114 are in fluid communication with chamber 122 of assembly 230. Chamber 122 is located on the upstream side of disk 100. Therefore, fluid from pressure vessel 11 can bypass and flow around the secondary rupture disk assembly 240 via passageways 114, and bear against the primary rupture disk 100 of disk actuator assembly 30. Thus, coupling of unit 213 to unit 214 results in assembly 240 being placed in a bypassing, or open, position, and permitting flow of refrigerant thereby. Passageways 114 are formed between the inner diameter 116 of body 233 and pockets 115 of support 110. Although four such passageways 114 are depicted in FIG. 11, more or fewer passageways are acceptable, provided that the passageways offer little resistance to flow, and that support 110 is adequately guided within diameter 116.

Members 244 thus maintain secondary rupture disk 102 located within assembly 240 in a bypassed position. Upon the pressure acting upon rupture disk 100 exceeding a predetermined pressure, disk 100 ruptures. Refrigerant can flow around assembly 240, through chamber 122, through the ruptured disk 100, into chamber 125, through orifice 126, and bear against valve 220. Disk 100 is in fluid communication with valve 220, and allows the release of fluid through valve 220 to reduce the pressure within vessel 11. While the primary pressure relief unit 213 is coupled to the secondary pressure relief unit 214, the secondary rupture disk assembly 240 is rendered inoperable for controlling the discharge of fluid from the pressure vessel 11.

Figure 10:
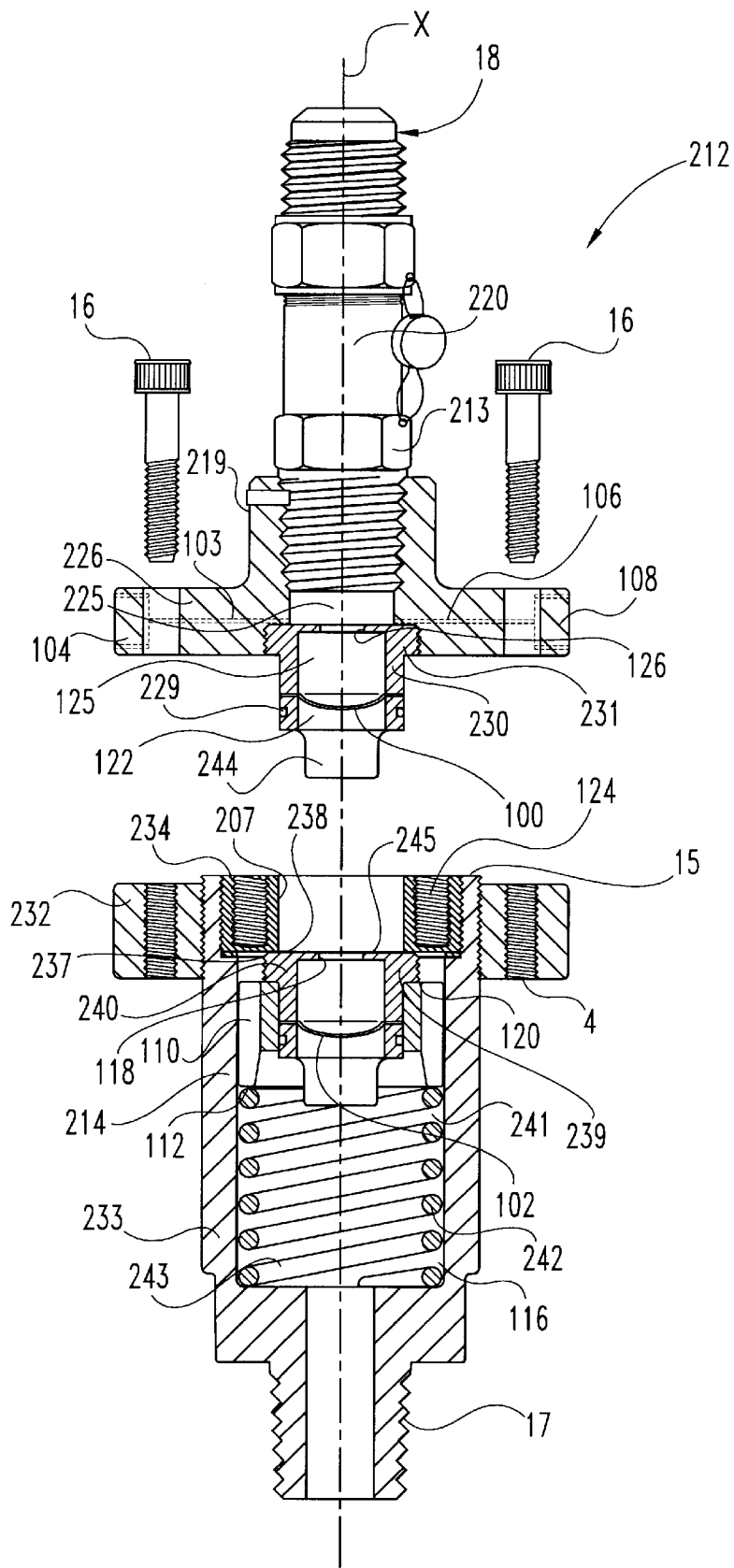
FIG. 10 is a side elevational view in full section of the mechanical pressure relief system of FIG. 7 with a primary pressure relief unit comprising a portion of the mechanical pressure relief system uncoupled therefrom.

With reference to FIG. 10, there is illustrated pressure relief system 212 with the primary pressure relief unit 213 uncoupled from the secondary pressure relief unit 214. Removal of the primary pressure relief unit 213 from the secondary pressure relief unit 214 is generally accomplished by loosening and removing the pair of fasteners 16 from the threaded apertures 4 of secondary unit flange 232. Upon the uncoupling and removal of the primary pressure unit 213 from the mechanical pressure relief system 212, the secondary rupture disk assembly 240 is biased by spring 242 acting through support 110 away from surface 243 so that annular seat surface 237 and the outer annular portion 238 of secondary body 239 are brought into a substantially fluid tight arrangement.

With the primary pressure relief unit 213 removed from the mechanical pressure relief system 212 the secondary rupture disk assembly 240 prevents the discharge of fluid into the environment and provides vessel over-pressurization protection. While the primary pressure relief unit 213 is removed from the pressure relief system 212 the pressurized fluid now acts against backup rupture disk 102 positioned within the secondary rupture disc assembly 240. If pressure within vessel 11 exceeds the rupture rating of disk 102, disk 102 fails and releases refrigerant through orifice 118 of body 239.

With reference to FIG. 11, actuating members 244 are contacting surface 245 of assembly 240 and preventing surface 238 from sealing against surface 237. Member contacting surface 245 is located radially inward of sealing surface 238. Support 110 slides within inner diameter 116 of body 33, supporting assembly 240 by shoulder 120. Refrigerant can flow around spring 242, assembly 240 and support 110 through passageways 114. Orifice 118 is disposed within assembly 240 and is in fluid communication with backup rupture disk 102.

Having described one embodiment of the pressure relief system 212 an example of its operation will now be described with the assistance of FIGS. 7–11. The pressure relief system 212 is connected to vessel 11 by engaging the connector 17 into a correspondingly threaded aperture within the vessel. With the pressure relief system 212 coupled to the vessel 11 the release of pressurized fluid from the vessel is normally eliminated and over-pressurization protection is provided by the primary pressure relief unit 213.

Primary rupture disk 100 normally forms a leak tight seal, blocking the flow of refrigerant from aperture 5. If pressure within vessel 11 exceeds the pressure level required to rupture disk 100, then disk 100 ruptures. Refrigerant under pressure flows into passageway 225 and into ports 104 and 108. Connection of a pressure switch and pressure gauge to ports 104 and 108 permits both remote and local sensing, respectively, of the increased pressure level within passageway 225 which is indicative of the rupture of disk 100. If the pressure within passageway 225 exceeds the pressure level setting of relief valve 220, then valve 220 opens and allows refrigerant to escape until pressure subsides and valve 220 is able to reseat and close. Valve 220 permits pressure vessel 11 to remain within a safe pressure range without complete loss of refrigerant as would be the case with a rupture disk venting to ambient.

Removal of the primary pressure relief unit 213 from a pressurized vessel 11 is accomplished by loosening the pair of fasteners 16 from the flange of the secondary pressure relief unit 214. Upon removal of the fasteners 16 the spring 242 urges the secondary rupture disk assembly 240 axially via support 110 against the transitional member 234 to form a fluid tight seal between annular portion 238 and annular sealing surface 237. The secondary rupture disk assembly 240 now preventing the normal discharge of fluid from the vessel 11 and providing over-pressure protection. If pressure within vessel 11. exceeds the pressure level required to rupture second disk 102, refrigerant flows out to ambient through hole 118. A refrigeration system technician uncouples primary disk actuator assembly 230 with failed rupture disk 100 and reinserts another assembly 230 with a new rupture disk 100.

With a new rupture disk inserted therein, the primary unit 213 is brought into and recoupled to secondary unit 214. The connection and tightening of the cap screws 16 draw the primary and secondary unit together. As the primary unit is connected to the secondary unit primary disk actuator 230 renders secondary rupture disk assembly 240 inoperable for controlling the release of fluid from the vessel 11. Secondary rupture disk assembly 240 becomes biased away from sealing surface 237.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for relieving excessive pressure from a refrigeration system, comprising:

a first rupture disk in fluid communication with the refrigeration system;

an actuator coupled to said first rupture disk; and a second rupture disk having a sealing position and a bypassing position, said second rupture disk being held in said bypassing position by said actuator.

2. The apparatus of claim 1 further comprising:

a relief valve in fluid communication with said first rupture disk.

3. The apparatus of claim 2 further comprising a body, wherein said second rupture disk is slidable within said body.

4. The apparatus of claim 1 further comprising a spring, and wherein said spring urging said second rupture disk to said sealing position.

5. An apparatus, comprising:

a refrigeration system;

a removable primary rupture disk in fluid communication with said refrigeration system;

a secondary rupture disk in fluid communication with said primary rupture disk and said refrigeration system, said secondary rupture disk having an open and closed positions;

means to hold said secondary rupture disk in said open position; and means to urge said secondary rupture disk to the closed position;

wherein said secondary rupture disk is normally in said closed position when said primary rupture disk is removed from said refrigeration system.

6. The apparatus of claim 5 further comprising:

a reseatable pressure relief valve in fluid communication with said first rupture disk.

7. The apparatus of claim 5 further comprising a passageway, wherein said second rupture disk is slidable within said passageway between the open and closed positions.

8. An apparatus, comprising:

a refrigeration system;

a passageway in fluid communication with said refrigeration system;

a first rupture disk moveable within said passageway between a sealing position and a bypassing position;

a removable actuator member for placing said first rupture disk in the bypassing position; and a spring urging said rupture disk to the sealing position.

9. The apparatus of claim 8 further comprising a second rupture disk in fluid communication with said passageway and said first rupture disk.

10. The apparatus of claim 9 further comprising a relief valve in fluid communication with said second rupture disk.

11. A method for protecting a pressure vessel of a refrigeration system from over-pressurization, comprising:

permitting flow of refrigerant in a passageway arround a backup rupture disk, the passageway being in fluid communication with the pressure vessel;

sealing the passageway with a primary rupture disk removing the primary rupture disk; and sealing the passageway upon completion of said removing with the backup rupture disk.

12. The method of claim 11 further comprising relieving pressure from the pressure vessel by a reseatable relief valve upon failure of said primary rupture disk.

13. A method for protecting a pressure vessel of a refrigeration system, comprising:

sealing a passageway with a primary rupture disk, the passageway being in fluid communication with the pressure vessel;

coupling the primary rupture disk to a backup rupture disk;

holding open the backup rupture disk by the primary rupture disk; and sealing the passageway with the backup rupture disk by removing the primary rupture disk.

14. The method of claim 13 further comprising relieving pressure from the pressure vessel by a reseatable relief valve upon failure of said primary rupture disk.

15. A method for protecting a pressure vessel of a refrigeration system, comprising:

blocking the flow of refrigerant from an aperture with a first rupture disk, the aperture being in fluid communication with the pressure vessel;

placing a second rupture disc in fluid communication with the aperture, the second rupture disk being downstream of the aperture and upstream of the finest rupture disk;

bypassing the second rupture disk when the first rupture disk is installed; and locating a pressure relief valve in fluid communication with the first rupture disk.

16. The method of claim 15 which further comprises holding open the second rupture disk by the first rupture disk.

17. The method of claim 15 which further comprises coupling the first rupture disk to the secondary rupture disk.

18. The apparatus of claim 9 which further comprises a body, and wherein said second rupture disk is slidable within said body.

* * * * *

UNITED STATES PATENT AND TRADEMARK OFFICE
CERTIFICATE OF CORRECTION

PATENT NO. : 5,768,895
DATED : June 23, 1998
INVENTOR(S) : Luther D. Albertson, Walter R. Key and Mark B. Key It is certified that error appears in the above-indentified patent and that said Letters Patent is hereby corrected as shown below:

In column 12, line 51, please delete the word "finest" and insert in lieu thereof --first--.

Signed and Sealed this

Fifth Day of January, 1999

Attest:

Attesting Officer

*Acting Commissioner of Patents and Trademarks*